United States Patent
Brebant (10) Patent No.: US 10,207,396 B2
(45) Date of Patent: Feb. 19, 2019

(54) MULTI-FUNCTION TPMS TORQUE TOOL

(71) Applicant: ATEQ, Les Clayes Sous Bois (FR)

(72) Inventor: Morgan Brebant, Les Clayes Sous Bois (FR)

(73) Assignee: ATEQ, Les Clayes Sous Bois (FR)

( * ) Notice: Subject to any disclaimer, the term of this patent is extended or adjusted under 35 U.S.C. 154(b) by 190 days.

(21) Appl. No.: 15/231,850

(22) Filed: Aug. 9, 2016

(65) Prior Publication Data

US 2017/0043462 A1    Feb. 16, 2017

Related U.S. Application Data

(60) Provisional application No. 62/203,092, filed on Aug. 10, 2015.

(51) Int. Cl.
| | |
|---|---|
| *B60C 23/04* | (2006.01) |
| *B25B 27/00* | (2006.01) |
| *B25B 23/142* | (2006.01) |
| *B60C 25/18* | (2006.01) |
| *G01L 3/10* | (2006.01) |

(Continued)

(52) U.S. Cl.
CPC ........ *B25B 27/0035* (2013.01); *B25B 13/463* (2013.01); *B25B 13/48* (2013.01); *B25B 23/1425* (2013.01); *B60C 23/0494* (2013.01); *B60C 23/0498* (2013.01); *B60C 25/18* (2013.01); *G01L 3/10* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02
USPC ................................ 73/146–146.8
See application file for complete search history.

(56) References Cited

U.S. PATENT DOCUMENTS

| | | | |
|---|---|---|---|
| 2009/0139063 A1* | 6/2009 | Shimura | B60C 23/0408 24/274 R |
| 2010/0238011 A1* | 9/2010 | Carr | B60C 23/0408 340/442 |

(Continued)

FOREIGN PATENT DOCUMENTS

| | | |
|---|---|---|
| CN | 104908003 B | 1/2017 |
| DE | 20315000 U1 | 12/2003 |

OTHER PUBLICATIONS

OTC TPM Electronic Torque Wrench model 3822-25, www.otctools.com <http://www.otctools.com>.

(Continued)

*Primary Examiner* — Andre Allen
(74) *Attorney, Agent, or Firm* — Young Basile Hanlon & MacFarlane, P.C.

(57) ABSTRACT

A multi-functional TPMS sensor fastener torque tool includes a torque driver and a user interface which allows a user to identify the TPMS sensor to be serviced, obtain a recommended fastener torque from a reference torque value database, measure the torque applied to the sensor fastener and alert the user when the reference torque has been reached or exceeded. In one example, the reference TPMS fastener torque values are stored in a memory device in the torque tool which are accessible through a plurality of graphic user interface menus on a display device.

16 Claims, 7 Drawing Sheets

(51) Int. Cl.
*B25B 13/46* (2006.01)
*B25B 13/48* (2006.01)

(56) References Cited

U.S. PATENT DOCUMENTS

2011/0203711 A1* 8/2011 Monjuvent ......... B60C 23/0408
  152/427
2015/0317894 A1* 11/2015 Chen ....................... B60C 25/00
  340/665

OTHER PUBLICATIONS

KTC Digital Ratchet Torque Wrench Series GEK, www.gaugecity.com <http://www.gaugecity.com>.
Schrader Nut Torque Wrench Set 20139, www.TPMS.com <http://www.TPMS.com>.
ACDeloo "ARM303-4A-340 Digital Angle Torque Wrench" Product Information Manual.
Anonymous: "ARM331-21¼" Interchangeable Digital Torque Wrench" Jul. 6, 2015 (Jul. 6, 2015), XP055318741, Retrieved from the Internet; URL: http://www.acdelco-tools.com/index.php?route=product/product&product_id-177 [retrieved on Nov. 11, 2016] the whole document.
International Search Report PCT/IB2016/01294, dated Nov. 23, 2016.

* cited by examiner

MULTI-FUNCTION TPMS TORQUE TOOL

CROSS-REFERENCE TO RELATED APPLICATIONS

The present invention claims priority benefit to U.S. Provisional Application Ser. No. 62/203,092 filed Aug. 10, 2015 the entire contents of which is incorporated herein by reference.

TECHNICAL FIELD

The invention generally relates to the field of tire pressure monitoring systems (TPMS). The invention is particularly useful in installing and servicing TPMS sensors on automotive vehicle wheels.

BACKGROUND

The inclusion of tire pressure monitoring systems (TPMS) for light passenger vehicles was enacted into law in the United States in 2007 and Europe in 2012. Millions of US and European passenger vehicles now include these sensors which require service and replacement over time. TPMS systems are important vehicular safety systems and use has expanded beyond passenger vehicles from over the road trucks to motorcycles.

A common form of TPMS sensor includes a sensor that is connected to the tire valve stem and is mounted to the inside of a vehicle wheel or rim exposed to the pressurized air interior of the vehicle tire. Common forms of these sensors include a clamp-type mounting and a snap-on mounting.

In servicing these TPMS sensors, service garages often had to use several distinct and different tools to disassemble, remove and replace worn or damaged TPMS sensors. Prior tools or tool kits included a torque wrench, a valve stem wrench, grommet wrench, a screw driver and specialty driver sockets and bits in order to remove or replace the sensors. If one or more of these tools was temporarily misplaced or lost, a technician would have to find or purchase a replacement which is costly and increases the time to conduct the TPMS repair or replacement.

With TPMS mandated for passenger vehicles, many companies have entered the commercial market with competitive TPMS sensors. These competitive sensor manufacturers design and manufacture TPMS sensors to their own specifications depending on the features and performance specifications required by the vehicle original equipment manufacturer (OEM) customer. For example, a TPMS sensor manufacturer may sell several lines of TPMS sensors which have different constructions, installation instructions, programming protocols, communication protocols and functional features.

The number of different TPMS sensor manufacturers and available sensors generates dozens and dozens of different TPMS sensors for service garage technicians. When a TPMS-equipped vehicle enters a service garage, a lot of time is traditionally spent by technicians to determine what type of TPMS sensor was originally installed on the vehicle or specified by the OEM. Once the proper TPMS sensor is identified, technicians traditionally would then have to research or look-up the proper installation instructions and specifications, for example the recommended installation torque, to install the replacement TPMS or reinstall the existing TPMS sensor. In some instances and/or in the interest of saving time, technicians may simply apply an installation torque based on the technician's experience due to the burden and effort to research, for example, installation torque specifications for a particular brand and model of TPMS sensor. This can result in damage to the TPMS sensor or a less than optimal installation of the sensor.

There is a need to provide a multi-functional TPMS sensor tool which integrally includes most, if not all, of the tools typically needed to remove and replace common TPMS sensors and associated valves which will increase the speed and efficiency of technicians working on these TPMS devices. This is further a need for a TPMS tool that includes a database of TPMS sensor makes, models, year reference torque specifications and other information that a technician can quickly access and display on a screen for rapid identification of sensor information and then proper installation using the same tool.

BRIEF SUMMARY

A multi-functional TPMS torque tool is disclosed and illustrated below. One example of the tool includes an electronic control unit for the storage and access of reference TPMS sensor information, for example recommended reference torque force specifications for the TPMS sensor fasteners. A user interface allows a technician to access, manipulate and display stored TPMS sensor information for rapid identification of the proper TPMS sensor and reference specifications for use by the torque tool in the service or replacement of TPMS sensors.

In one example, the tool measures the torque applied through the torque driver, compares that to the stored reference torque specification value for the selected TPMS sensor and alerts the technician when the stored recommended torque has been achieved or exceeded.

In another example, the torque tool can receive reference TPMS sensor information and torque values from a remote device, for example a hand-held TPMS diagnostic tool.

In another example, the tool includes a torque wrench operable for both common TPMS sensor fasteners, a nut or bolt. In another example, the tool may include additional devices including a gasket or grommet tools and a valve core wrench.

The present inventive tool provides numerous advantages and improvements over prior devices and processes which increases the accuracy, safety and efficiency of service on TPMS valve systems.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Referring to FIGS. 1-12, examples of a multi-function TPMS torque tool 10 and methods of use are disclosed and illustrated. The device and methods are particularly useful in assembling and disassembling direct TPMS valve assemblies in modern passenger vehicles equipped with tire pressure monitoring systems (TPMS) although there may be other uses or applications known by those skilled in the art.

Figure 3:
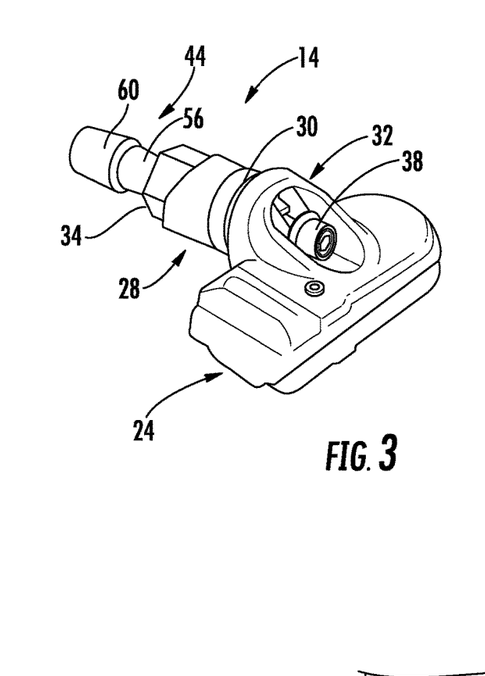
FIG. 3 is an example of a conventional TPMS clamp-type valve.
Figure 4:
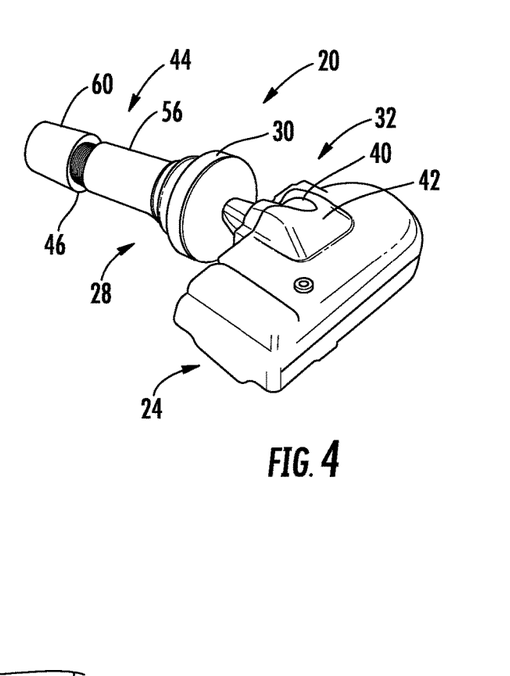
FIG. 4 is an example of a conventional TPMS snap-in-type valve.

The exemplary tool 10 is particularly, but not exclusively, useful for removing or installing clamp-type TPMS valves 14 generally shown in FIG. 3 and snap-in-type TPMS valves 20 as generally shown in FIG. 4. Referring to FIGS. 3 and 4, the clamp and snap-in TPMS valve assemblies generally include a sensor 24 which is mounted on the inside of a wheel rim (not shown) within the pressurized tire interior once a tire is installed.

Figure 5:
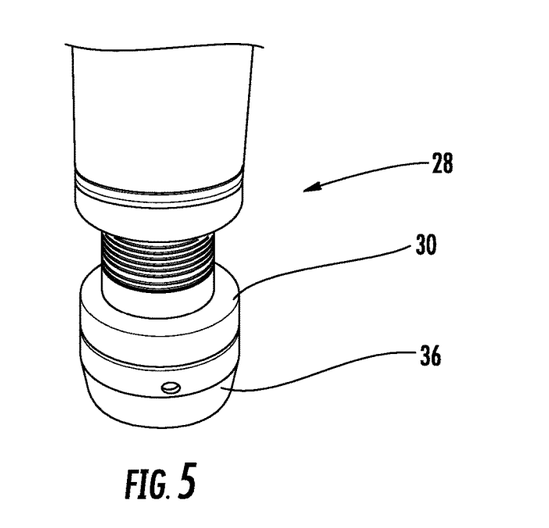
FIG. 5 is an enlarged perspective view of one end of a valve stem including a grommet for use in the clamp-type valve in FIG. 3.

As best seen in FIGS. 3-5, the clamp and snap-in valves generally include a grommet assembly 28 having a grommet 30 which connects to the sensor and seals a valve stem opening in the tire rim to prevent loss of pressurized air from the tire. Referring to FIGS. 3 and 5, the clamp-type sensor grommet assembly 28 may include a ball and socket joint with the sensor 24, the ball 36 on the end of the grommet assembly and a socket (not shown) formed in the sensor 24 housing as generally seen in FIG. 3. A screw, bolt or threaded fastener 38 is typically used to secure the sensor 24 to the grommet assembly 28, valve stem assembly and tire rim (not shown). A nut 34 is used to further secure the valve stem 44 and sensor 24 to the rim and axially compress the grommet 30. In the snap-in-type sensor shown in FIG. 4, a different ball 40 and socket 42 arrangement is used generally as shown.

As best seen in FIGS. 3-5, each of the clamp 14 or snap-in 20 valves include a valve stem 44 which is connected to the grommet assembly 28 and serves as the entry or exit of pressurized air in the vehicle tire mounted on a rim. The valve stem 44 generally includes a hollow needle valve (not shown) having threaded portion 46 inside which is mounted a removable air valve core (not shown). A removable cap 60 is threaded onto the exterior threaded portion 46 of the valve stem as generally shown. Once installed, the valve stem 44 is airtight with the wheel rim and the sensor 24 monitors tire conditions and typically communicates the conditions to the vehicle electronic control unit (ECU) for display to a vehicle driver.

Figure 1:
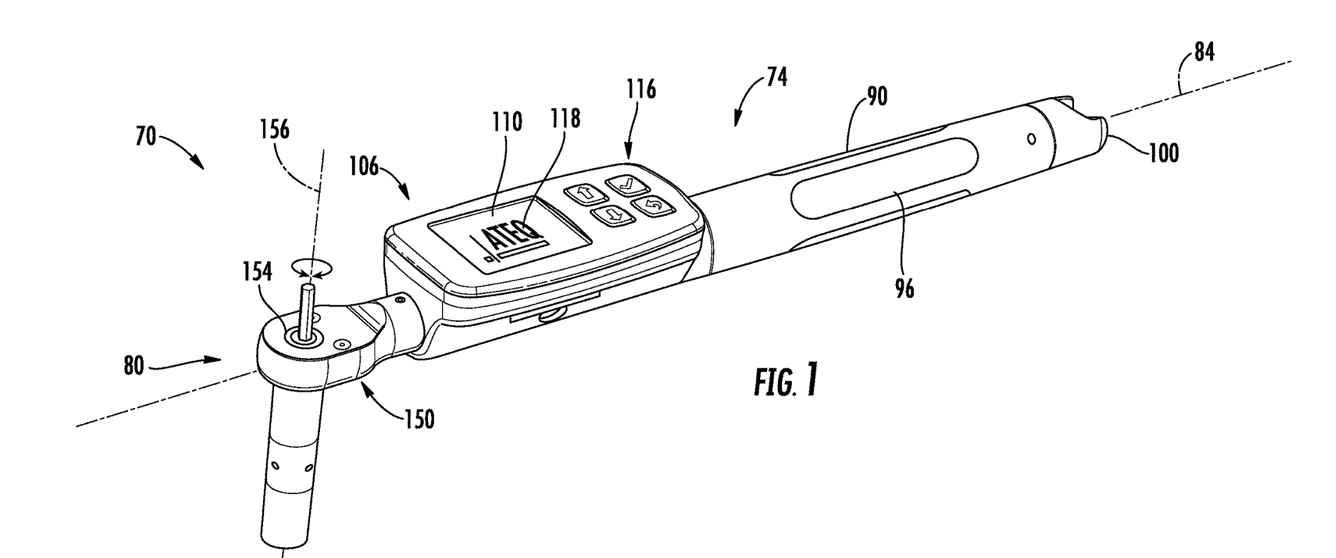
FIG. 1 is a perspective view of one example of a multi-function TPMS torque tool.
Figure 2:
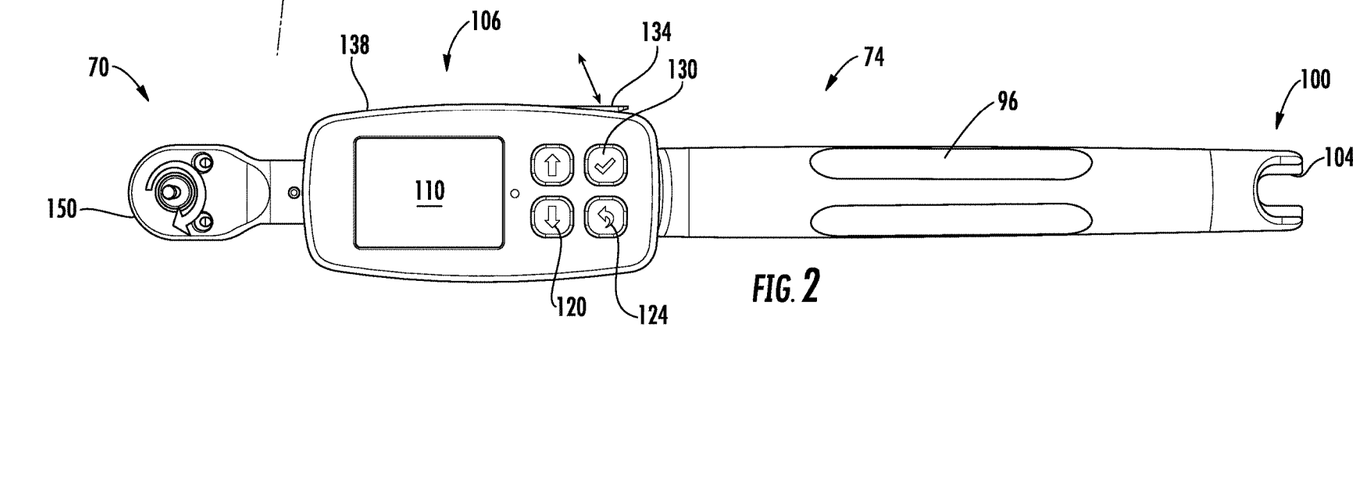
FIG. 2 is an plan view of the tool in FIG. 1.

Referring to FIGS. 1 and 2, an example of a multi-function TPMS torque tool 10 is shown. In the example, tool 10 includes a tool body 74 and a tool head 80 extending along a longitudinal axis 84 as generally shown. Tool body 74 preferably includes an elongate handle 90 having a hand-grip portion 96. Hand grip portion 90 is shown as permanent elastomeric inserts which provide a sure frictional and cushioning surface to a user's hands. It is understood that other grip 96 features can be used, for example integrally molded knurled areas into the material that forms handle 90. Other grip portions 96 and techniques known by those skilled in the art may be used.

In the example, a removable end cap 100 threadingly engages a threaded end of the handle 90. An internal storage cavity (not shown) for tool bits or other accessories as further described below may be included in tool body 74. Tool body 74 is preferably made from a polymeric material suitable for an industrial automotive service garage environment. Other materials known by those skilled in the art may be used.

Figure 9:
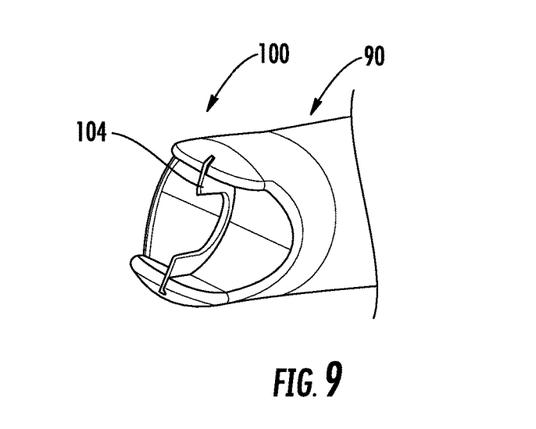
FIG. 9 is a partial perspective end view of the tool in FIG. 1.

In a preferred example best shown in FIGS. 2 and 9, tool 10 further includes a gasket or grommet removal device 104 molded or otherwise fixedly secured into the handle 90 as generally shown. Device 104 is useful, for example, forcibly inserting device 104 between a grommet 30 and the adjacent components to separate and disassemble the valve stem 44 shown in FIGS. 3-5. Devices other than grommet removal device 104, useful for other purposes, may be used as known by those skilled in the art.

Tool 10 further includes a user interface 106 preferably in the form of a visual display 110 including a keypad 116 contained within a housing 112 as generally shown. Visual display 110 can be one of many available electronic, highly visible display devices for example an organic light emitting diode (OLED), light emitting diode (LED), a liquid crystal display (LCD), or other visual display device for producing textual, graphic and symbolic images visible to the human eye. Visual display 110 can be connected to a circuit board included as part of an electronic control system discussed further below. In a preferred example, the user interface further includes an alert device, for example an audible signal or alarm, to alert a user the referenced or recommended torque force has been achieved discussed further below.

Figure 11:
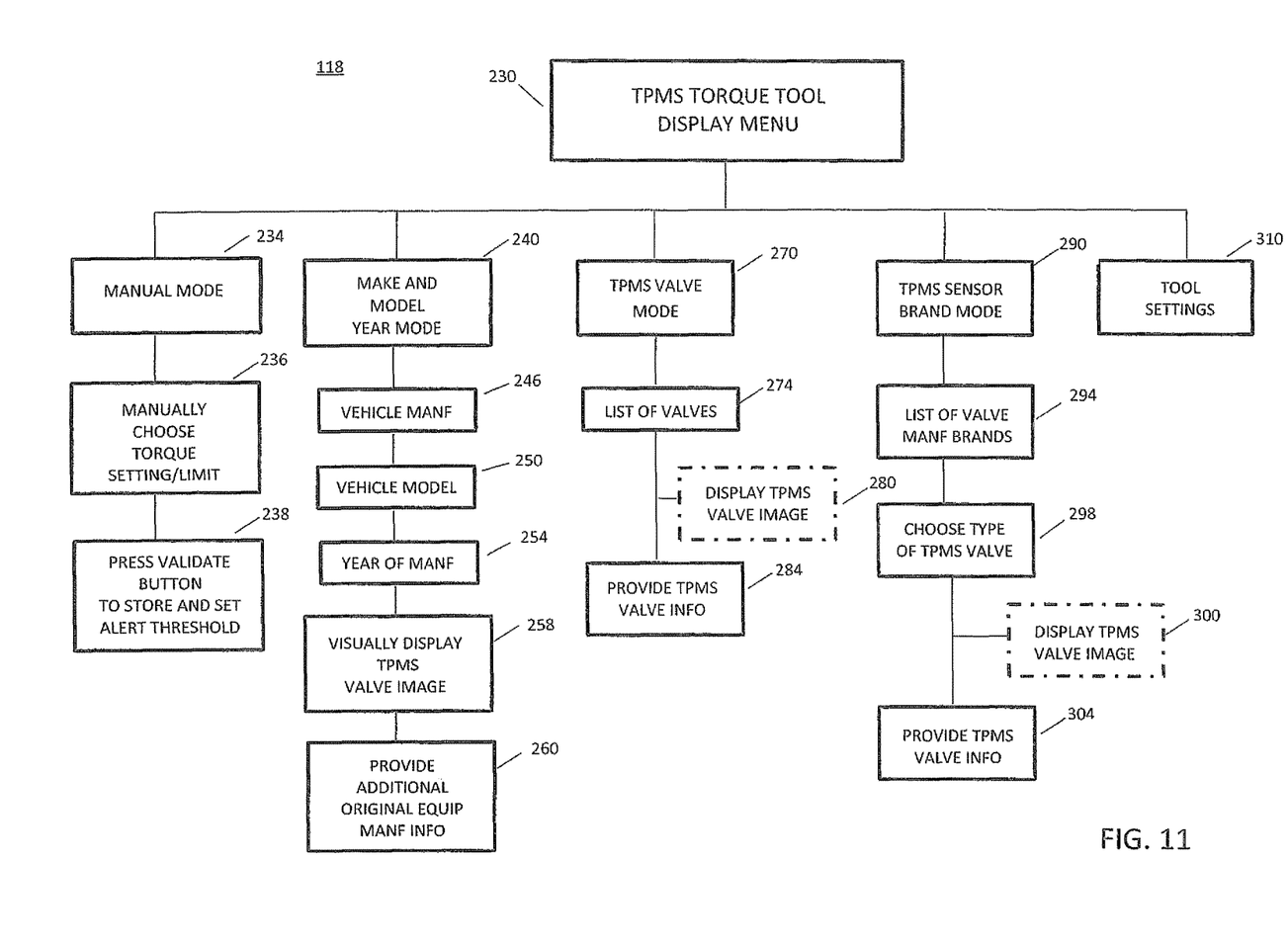
FIG. 11 is flow chart of an example of a menu hierarchy for use with a user interface for the tool in FIG. 1.

The display 110 may be used to provide textual and graphic information to a user on the status of the tool, TPMS sensor reference information and conditions of the tire and surrounding environment. As best seen in FIG. 11, tool display 110 may include one or more preprogrammed and stored menus or graphic user interfaces (GUI's) 118 and/or provide a single view of certain characteristics or features including notices or alerts that: the tool 10 is ready to use, a graphic or text of the torque force that is being applied, the tool is waiting to receive infrared (IR) information and/or has received IR information, battery condition, the tool is in "manual" mode, the tool has malfunctioned, environmental temperature and other factors and conditions known by those skilled in the art.

Exemplary keypad 116 includes up and down buttons 120 and a return button 124 for navigating preprogrammed menus to selected menu options for executing selected functions as further described below. In one example, a validation button 130 is included as further described below. It is contemplated that visual display 110 may be a touch sensitive or responsive screen which may reduce or eliminate the need for a keypad 116 to navigate the GUIs 118.

In a preferred example, user interface 106 further includes a mini-USB port 138 in the side of the user interface 106 as generally shown. USB port 138 is in electronic communication with an electronic control device as described below for the importing and exporting of data, programs and instructions, for example to update the software or firmware of the electronic control device or the reference torque value or other data stored in the electronic control unit. Other transfers of data, instructions and communications to and from user interface 106 known by those skilled in the art may be used. The transfers and exchanges of information or data can be done through the USB port or wirelessly through transmitters and receivers in the electronic control unit discussed further below.

A battery (not shown) used to provide power to user interface 106 may be removably stored in an accessible compartment on the backside of the user interface. The battery can be disposable, rechargeable or another form of power source known by those skilled in the art. An alternating current (AC) port (not shown) can also be included to charge a rechargeable battery, for example. In less sophisticated models, the tool 10 may simply be powered by an AC power cord through the described AC port.

Figure 7:
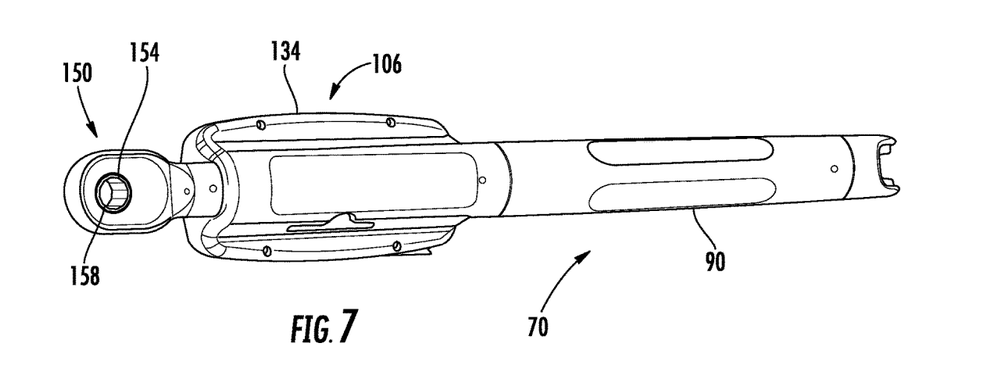
FIG. 7 is a bottom view of the tool in FIG. 1.

As best seen in FIG. 7, exemplary tool 10 user interface 106 preferably includes one or more accessory compartments 134 in the housing 112 for storing extra screw driving bits or other tool 10 accessories. Compartments 134 preferably include a hinged door or removable cover plate to close compartment 134 to house bits or other accessories useful to tool 10. In an alternate example, magnets (not shown) are connected to or embedded in housing 112. The magnets provide an attractive force to keep screw driving bits, sockets or accessories described below integral with tool 10. Alternately, tool end 100 may open to an interior storage area inside the handle 90. Other ways to secure bits to accessories, for example a channel with an interference fit with the bit, known by those skilled in the art may be used.

In a preferred example of tool 10, head 80 includes a manual torque driver 150 as generally shown. The exemplary torque driver 150 is useful for properly applying a specified torque (Newton Meters (N-m)) or Inch Pounds (in-lbs)) to mechanical fasteners such as TPMS sensor screws 38 as described above. Due to the nature and safety functions of TPMS, it is important that the sensors 24 are properly secured to the vehicle wheel using specified torques.

In the example, driver 150 includes a chuck 154 defining a through hole 166 through head 150 along a lateral axis 156. In a preferred example, chuck 154 defines a hexagonal, six-sided chuck or receiving circumferential surface for receipt of hexagonal shaped bits or accessories described below. Chuck 154 may be magnetic or include other devices, for example spring biased ball bearings (not shown), to deter unwanted disengagement of a tool or bit from chuck 154. It is understood that chuck 154 can take other shapes, forms and orientations with respect to head 150 and tool 10 as known by those skilled in the art.

In a preferred example, chuck 154 includes an internal ratchet mechanism (not shown). The ratchet mechanism allows the contact hexagonal surface of the chuck engaged with the bit holder 160 to remain rotationally fixed when force is applied to the bit holder 160 in a clockwise direction about axis 156 to tighten a TPMS screw 38 or nut 34, for example. The ratchet mechanism allows the chuck bearing surface to rotate about axis 156 when the handle 90 is rotated in a counter-clockwise direction to recover the angular displacement covered on a clockwise tightening movement so another clockwise tightening movement can be executed for rapid tightening of the TPMS fastener. A reverse switch or lever (not shown) may be employed to reverse the ratchet device so that the chuck bearing surface is fixed when force is applied to the handle in the counterclockwise direction. In one example a spring-loaded gear and pawl mechanism may be used for the internal ratchet mechanism. Other known ratchet devices used in common hand tool sockets and other similar devices known by those skilled in the art may be used. In an alternate example, chuck 154 does not include a ratchet mechanism and is fixed in position with respect to the head 70 like a box-end wrench.

In the example head 150, head 150 is preferably made from a ferrous or non-ferrous metal which from the solid head 80 extends in the form of a hollow rod into a portion of the body 70 along the longitudinal axis and most preferably the full length of the handle 90 to the end cap 100. Other materials, constructions and configurations for head 150 known by those skilled in the art may be used.

In the example, a strain gauge (not shown) is attached to a portion of the head 150 extending into the body portion 74 as described above. A transducer generates a signal which is calibrated and converted to the selected unit of torque (N-m) or (in-lbs.) in the electronic control device described further below. Other components and methods used to measure the torque force applied at the head 150 and chuck 154 of tool 10 about lateral axis 156 known by those skilled in the art may be used.

Figure 6:
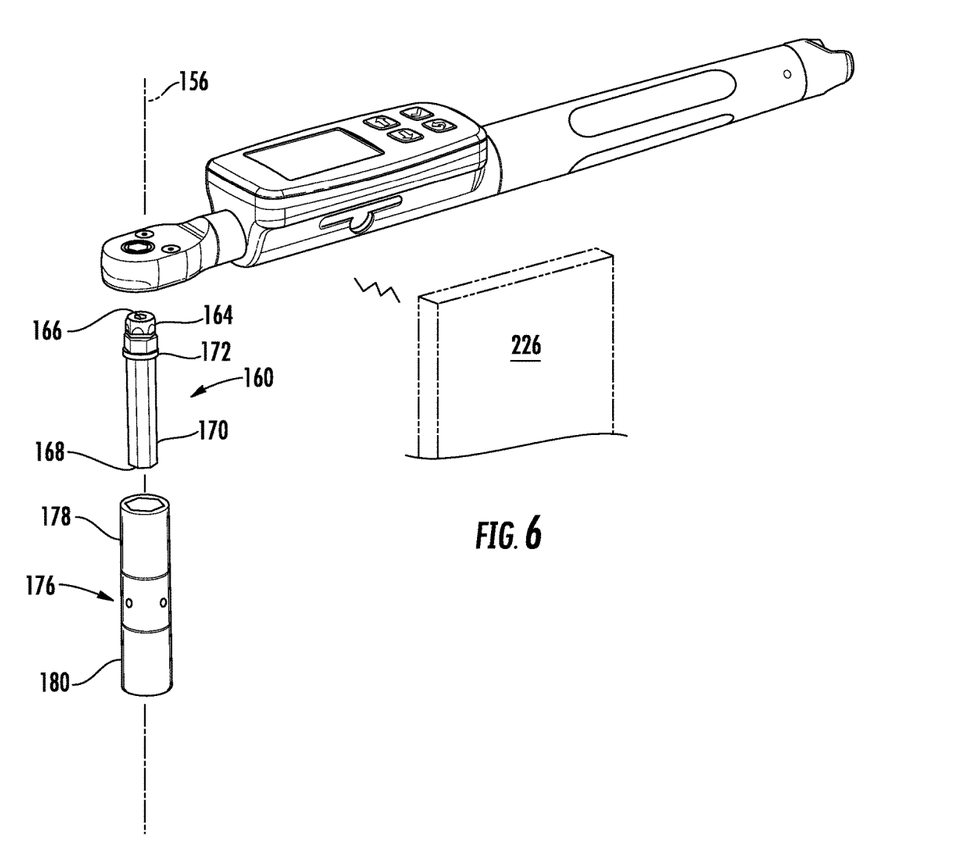
FIG. 6 is an exploded view of the example tool in FIG. 1 in use with a bit and a socket.

As best seen in FIGS. 1 and 6, tool 10 preferably includes a bit holder 160 which is slidingly and frictionally engaged by chuck 154. Bit holder 160 includes a first end 164 and a second end 168. Bit holder 160 preferably includes an elongate bore 166 in one end of an elongate shaft 170 as generally shown. In a preferred example, bore 166 is defined by a hexagonal, six sided circumferential surface. Shaft 170 is preferably a hexagonal, six-sided configuration that is complementary to chuck 154 to prevent rotation of holder 160 relative to chuck 154 thereby applying a torsional force to holder 160 on rotation of the handle 90 about lateral axis 156. In the example holder 160, shaft 170 further includes a stop 172 in the form of a radially extending annular ring which is larger in diameter than chuck hole 158 to prevent holder 160 from passing through hole 158. Holder 160 is preferably made from hardened steel. Other materials, constructions, forms and configurations for holder 160 known by those skilled in the art may be used.

Figure 8:
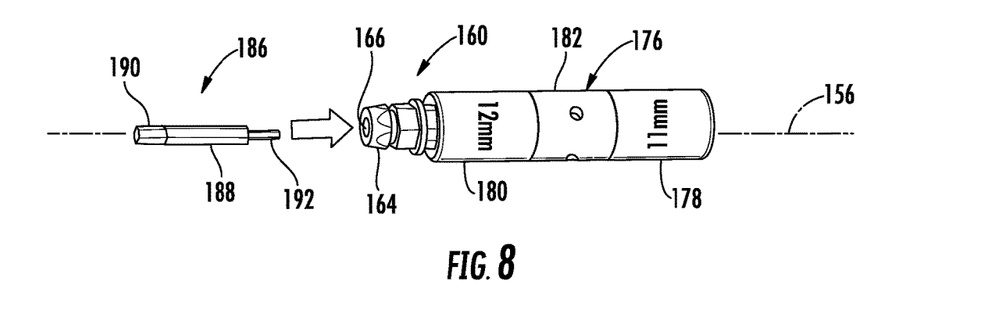
FIG. 8 is an exploded view of an example of a screw driving device useful with the tool in FIG. 1.

As best seen in FIG. 8, tool 10 preferably includes a screw driving bit 186 having a shaft 188, a driving tip 190 and an accessory end 192 opposite the driving tip 190 as generally shown. Shaft 188 preferably has a hexagonal, six sided exterior shape for cooperative sliding and frictional engagement with holder 160 bore 166 to prevent rotation of driving bit 186 relative to the holder when the holder is rotated about lateral axis 156. Driving tip 190 is preferably a 5-point or Torx® bit of a size commonly used with TPMS screws 38 as shown in FIG. 3. It is understood that tip 190 may take other forms for engaging screws, bolts or other fasteners, for example cross or phillips head, slot head, allen or hex-key wrench and other engagement forms known by those skilled in the art.

In the exemplary driving bit 186, accessory end 192 is preferably a narrow, cylindrical extension of shaft 188 as generally shown. It is understood that other constructions, forms and configurations for accessory end 192 may be used as known by those skilled in the art.

Screw driving bit 186 may alternately, or as a separate bit, take the form of multi-purpose air valve core wrench on one end and a an accessory end 192 as described above on the other. The bits may have engagement devices, for example spring-biased steel balls or bearings (not shown), which engage with existing slots or depressions in the valve core body. Other engagement or securing methods, for example magnetic, known by those skilled in the art may be used.

Other driver bits, for example flat head, phillips head and others common to TPMS sensors known by those skilled in the art may be used. Driving bit 186, and other bits and accessories contemplated herein, may be made from hardened steel or other materials suitable for the application.

As best seen in FIGS. 1, 6, 7 and 8, tool 10 may include a socket 176 for use in engaging and applying a selected torque force to a nut, for example a TPMS valve nut 34 as shown in FIG. 3. In the example, socket 176 preferably includes a first end 178 in the form of an 11 millimeter (mm) hex-head socket and a second end 180 in the form of a 12 mm hex-head socket. A body portion 182 is positioned between the first and second ends and includes an internal bore defined by a multi-faceted hexagonal, six-sided circumferential surface complementary to the exterior of holder 170 shaft 170.

As best seen in FIGS. 6 and 8, socket 176 slidingly and frictionally engages holder 160 which slidingly engages chuck 154 to provide a torque force on a fastener engaged with an appropriate end 178 or 180 of socket 176. As shown in FIG. 8, alternately, the socket 176 can serve as a handle or grip for a user to hand-tighten a screw using driving bit 186 as generally shown. Once hand-tight, the socket can be removed from holder 160 and holder 160 can be engaged with chuck 154 and a torque applied with tool 10 as described further below. It is understood that socket 176 can take other forms, configurations and constructions as known by those skilled in the art.

Figure 10:
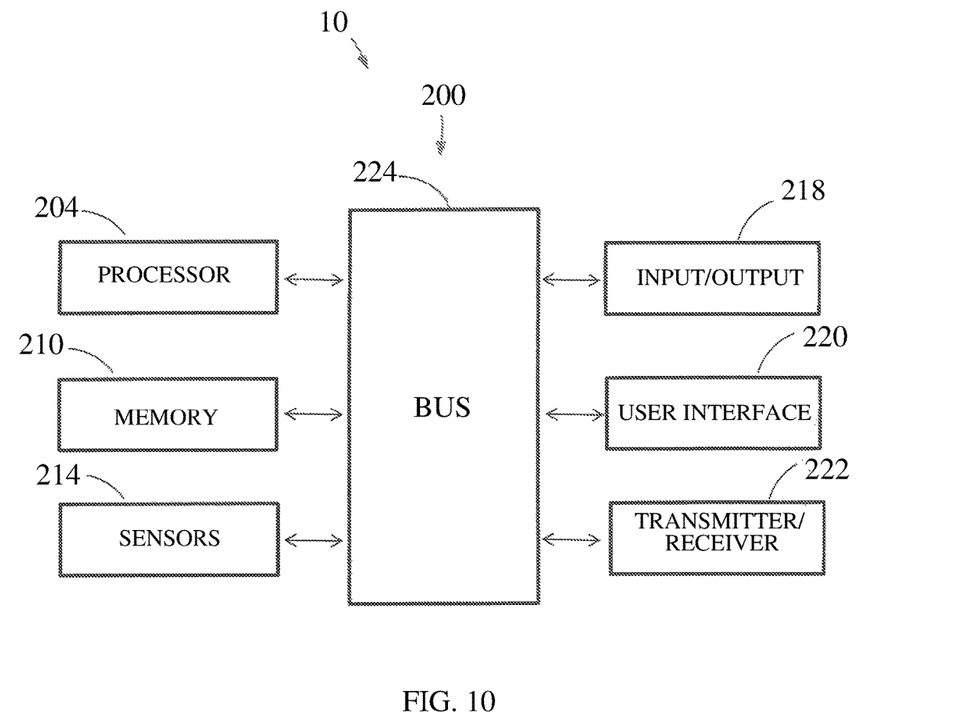
FIG. 10 is schematic of an electronic control module for the tool in FIG. 1.

Referring to FIG. 10, an example of an electronic control unit or system 200 for tool 10 and visual display 110 is illustrated. The example control system 200 includes a microprocessor or central processing unit 204, a data or computer memory storage device 210, sensors 214 which may include the torque sensor or measurement device described above, input and output ports and devices 218, user interfaces 220 which may include user interface 106 and display device 110 described above, and transmitters and/or receivers 222 which may be used for sending and receiving signals and electronic or digital data electronically through cables or wirelessly to other devices.

Control unit 200 memory storage device 210 may be a permanent memory device, such as a hard drive, or a temporary storage device such as a flash memory device capable of storing data, programmed software and/or instructions for execution and processing by the processor 204. In a preferred example further discussed below, memory storage device 210 stores one or more databases including TPMS systems and sensor reference information, for example, different brands and types of TPMS sensor valve assemblies and sensors and the recommended torque specifications for installation of each valve. Other databases, data and information for TPMS components and other systems and devices known by those skilled in the art may be stored in tool 10 control unit 200.

A programmable controller (not shown) may be used in system 200 to control and direct the activity and flow of data and instructions between the control unit 200 devices. In one example, pre-programmed instructions are stored in the memory storage device 210 and executed by the processor 204 when predetermined actions or conditions occur.

The control unit transmitter/receiver 222 may be used to communicate with independent devices, for example, a conventional, hand-held TPMS tool 226 or personal computer (not shown) commonly used in service garages. A suitable example of a hand-held TPMS device is the ATEQ VT-56 manufactured by ATEQ Corporation. Tools 226 typically have the capability to communicate with TPMS sensors 24 by wirelessly sending and receiving signals and data to and from the tool 226 and sensor 24. For example, tool 226 and tool 10 may communicate by one or more wireless protocols for example Bluetooth, Wi-Fi, GSM, cellular, and other networks such as local area networks (LAN), wide area networks (WAN), personal area networks, LTE and other wireless communication protocols and communication networks known by those skilled in the art. Cable connections such as RS232, Ethernet and other transmission devices known by those skilled in the art may be used. Other hardware, software, protocols, networks and other devices and techniques for communicating data known by those skilled in the art may be used. In a common exchange of signals and information, when a vehicle equipped with TPMS enters a service facility, a technician will use tool 226 to send a signal to each TPMS wheel sensor to "awaken" the sensors 24 which do not continuously send signals to conserve the sensor's internal battery life. Once alerted, the sensors 24 send data signals with some fundamental information, for example, a particular sensor identification number and the type or manufacturer of sensor, so the technician knows what sensors are in use on the vehicle.

In a preferred example of tool 10, tool 10 transmitter/receiver 222 is an infrared (IR) receiver and transmitter. In one example of tool 10, tool 10 may receive and send signals and data to tool 226, the wheel TPMS sensor 24 or other devices. Tool 10 may use other wireless communication protocols, for example Bluetooth, to transmit and receive signals and data known by those skilled in the art.

The exemplary devices illustrated in FIG. 11 are all, or selectively in electronic communication with each other through a bus 224, circuit board (not shown) or other component(s) or mechanisms known by those skilled in the art. It is understood that additional devices may be used in control unit 200 to achieve the functions and objectives described herein as known by those skilled in the art.

Referring to FIG. 11, examples of tool 10 graphic user interfaces (GUIs) 118 are illustrated. In a preferred tool 10, different modes of operation and retrieval of reference data or information from the control unit 200 are provided. Tool 10 preferably includes a manual mode 234 where preprogrammed reference torque specifications for a particular TPMS sensor are not retrieved and the tool is used as a traditional torque wrench. In one example, a user may select or input a maximum torque force value 236 into the visual display 110 using the keypad 116. The validate button 130 may be pressed to enter the value and establish a new threshold or maximum torque value 238. When torque is applied through the head 80 torque driver 150, an alert signal, for example an audible beep or a vibration in the tool generated by a vibratory device, may be used to alert the user that the threshold torque has been reached or exceeded to prevent over-tightening of the TPMS sensor screw 38, nut 34 or other fastener, for example.

In another example of a GUI 118 for tool 10 is identification of the TPMS sensor 24 through the make and model year of the vehicle 240. In the example, a user may navigate a list of vehicle manufacturers through the keypad 116 and visual display 110 to select the vehicle manufacturer 246, the vehicle model 250 and the year the vehicle was manufactured 254. On these selections, the control unit 200 searches in the memory device 210 and identifies the reference information on TPMS sensors 24 that were originally installed when the vehicle was manufactured or approved replacements. In an optional step 258, a visual image or photograph of the sensor 24 may be displayed for further recognition and verification of the proper sensor 24 to be used. In one example, additional information about or from the OEM 260 may be retrieved or automatically displayed. This may include recall notices, service bulletin information etc.

Exemplary GUI 118 may include a TPMS valve mode 270. In mode 270, the user may search for information or specifications by the known specific TPMS sensor 24. For example, a reference list of all of the commercially sold TPMS sensors 274 by brand or by model number may be stored in memory storage device 210. A user can navigate the GUI 118 to retrieve and review a list of the commercially available sensors by model number, brand name, visual image of the different types of valve assemblies, for example clamp or snap-in, or other indicator to find the particular sensor removed from the vehicle or a new sensor that is ready for installation. On identification, an optional step 280 may display a visual image of the chosen sensor as described above. In exemplary step 284, a user may access additional information beyond reference torque specifications that is stored in the memory storage device.

Exemplary GUI 118 may include a TPMS sensor brand mode of operation 290. In the example, a user may search for TPMS sensor information by choosing a brand from a list of brands/companies stored in the memory storage device 210. A list of sensors 294 by a chosen brand or source may be retrieved from memory and displayed. On selection of a brand, an option to input or select the type of sensor 298, for example clamp or snap-in, may be made and an image of the selected type or both may be displayed 300. The user may further access additional information about the selected sensor 304 as described above.

The exemplary GUI 118 may further provide a settings menu or screen to customize or change settings or preferences for the tool 10. For example, a user may want to change the units of torque forces displayed from newton-meters (N-m) to inch-pounds (in-lbs.). Other settings and preferences of tool 10 known by those skilled in the art may be used.

It is understood that different GUIs 118 and different options or available menus may be used as known by those skilled in the art.

Figure 12:
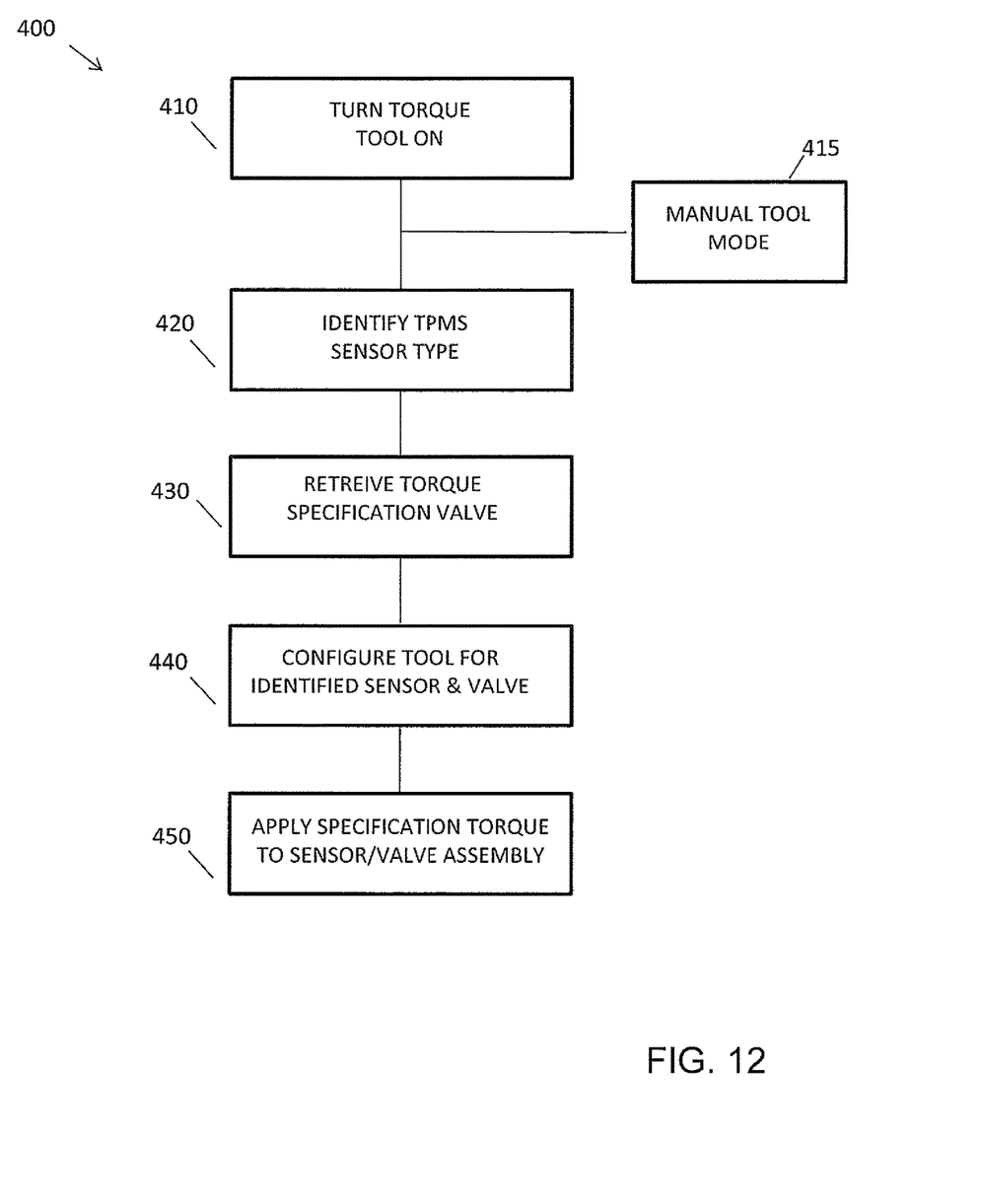
FIG. 12 is flow chart of an example of a method for installing a TPMS fastener through a torque tool.

Referring to FIG. 12, an example of a process 400 for using the tool 10 to apply a specification torque force on an exemplary TPMS sensor and valve assembly 24 is illustrated. In the example, tool 10 is turned on in step 410. This can be achieved, for example, through an on/off power button (not shown), switch or other activation action or process known by those skilled in the art. On tool 10 power turn on, an initial start-up GUI 118 is preferably displayed on visual display 110.

At optional step 415, a user can choose through the GUI 118 whether to operate the tool 10 in a manual mode similar to a traditional torque wrench operation as described above. In one example of manual operation, the user to manually input or choose an acceptable or maximum torque force to be applied, establish that value as the threshold by pushing the validation button 130 which stores the threshold value. On an applied torque by head 80 on a screw 38 or nut 34 of a value equal to the threshold value, an audible beep or other alert by a speaker (not shown) in housing 112 may be used to signal the user that the threshold value has been achieved. Alternately, or in addition to an audible alert, a visual alert may be produced on the visual display 110, for example a flashing screen.

Alternately and preferably, in step 420 the tool 10 is used to identify the proper or appropriate TPMS sensor and valve assembly 24 for the vehicle of interest. Referring to FIG. 11, this may be done by at least three different ways or modes through visual display 110. For example, the vehicle TPMS sensor can be identified through input and/or selection through the GUI 118 using the vehicle make, model and year 240; selection from a list of TPMS valve types 270 or selection from a list of reference TPMS valves by brand or source 290 as described above. Alternately, the tool 10 can receive signals or data identifying the TPMS valve from the vehicle TPMS sensor itself, the vehicle electronic control unit (ECU), from a hand-held TPMS tool 226 or from another device (not shown), through wireless transmission means or electronic transfer of data, for example a USB cable through USB port 138. For example, TPMS tool 226 may identify a TPMS sensor make and model through receipt of signals and data from the TPMS sensor 24 or the vehicle electronic control unit. Alternately, tool 226 may optically scan a bar code or other indicia on the a TPMS sensor 24 or valve assembly visible on the sensor itself once removed from the wheel or from a sensor 24 packaging or labeling in the example of a new sensor to be installed. The tool 226 can transmit the received or read sensor 24 data to the tool 10 for receipt through tool 10 receiver 222 and into the control unit 200 for processing consistent with the methods described herein.

In step 430, the proper exemplary reference torque force or specification is retrieved and preferably displayed on visual display 110. In a preferred method described above, the tool 10 memory storage device 210 stores a database of reference torque force values or ranges as recommended by the TPMS valve manufacturer, vehicle OEM or as established by industry. As described above, a visual image of the TPMS valve sensor 24 may be displayed on visual display 110. It is understood that other specification values other than torque force may be stored, retrieved and displayed in a similar manner by tool 10 to suit the tool 10 and the particular application.

In an alternate of step 430 (not shown), the tool 10 may receive the proper TPMS valve assembly reference torque specification value or values from an independent or remote device, for example a personal computer or TPMS hand-held tool 226. In the example, the independent tool 226 may store in a memory storage device the reference or recommended torque values and ranges in an information database or repository and selectively transfer that reference torque value specification or data to the tool 10 for receipt by receiver 222 and processing in control unit 200 as described above.

In step 440, the tool 10 is configured for the appropriate work or task on the TPMS valve assembly, for example tightening a TPMS valve assembly to a wheel rim. In two examples described above, either a screw driving bit 186 or a socket 176 is installed in tool head 80.

Referring to FIGS. 1, 6 and 8, if a torque force is to be applied to a screw or bolt 38, an appropriate screw driving bit 186 is preferably inserted into holder 60 as best seen in FIG. 8. In an optional step not shown, a user can also engage a socket 176 on the other end of the holder 160 and use the assembly to start threading screw 38 into the valve assembly and tighten the screw 38 to a low torque by hand. Alternately, holder 160 can be installed into head 80 through chuck 154 as best seen in FIG. 8. In the holder 160 installed position, holder 160 is rotatably fixed relative to chuck 154 about axis 156 preventing relative rotation between head 80 and holder 160.

In step 450, bit 186 tip 190 is then engaged with screw 38 and a torque force is applied through rotation of tool handle 90 about lateral axis 156. The tool internal torque sensor measures the applied torque, and the control unit 200 converts the measured force data to a numerical value and registers or stores the measured torque in the tool electronic control unit 200. The measured torque is compared to the stored reference torque value or range for the selected TPMS valve and a determination is made in control unit 200 whether or not the measured torque is equal to or exceeds the specified or threshold reference torque value. If the measured torque is equal to or exceeds the stored threshold reference torque value the user is preferably alerted in a manner described above. In a typical, but not exclusive range, the specified TPMS valve assembly torque values for screw will range between 0.1-5 Newton-meters (N-m) for TPMS valve assembly screws and between 5-8.5 Newton-meters (N-M) for TPMS valve assembly nuts. It is understood that torque values above and below this range may be used with, or applied by, tool 10. In one example, depending on whether the identified sensor 24 is a clamp or snap-in type of valve assembly, the tool 10 can establish or default to a range of torque values to use as the default or display due to knowing the general construction of the sensor 24 being serviced. Other comparisons of data or alerts to the user may be made depending on the application as known by those skilled in the art.

If a specified torque is to be applied to TPMS valve nut 24, socket 176 is alternately engaged with holder 160 as best seen in FIG. 6. A similar process is used to apply at torque to the nut 34, measure the applied torque, compare the measured torque to the threshold reference torque value and provide an alert as described above for screw driving bit 186. Use of holder 160 and socket 176 to first hand tighten a nut prior to engagement of holder 160 to chuck 154 is also contemplated similar to that described above for screw driving bit 186.

In an exemplary step (not shown), when the holder 160, socket 176 and screw driving bit 186 are not in use, these may be stored in the tool 10 compartment 134. Alternately, these bits may be secured to the tool body 74 through magnets in the housing 112 or handle 90 as previously described.

In an alternate step (not shown), tool 10 may also be used to loosen a secured TPMS valve screw 38, nut 34, other fastener. In one example using FIG. 6 as a guide, the tool body 74 is rotated 180 degrees about longitudinal axis 84 so the visual display 110 is pointed downward. Holder 160 and the appropriate engaged socket or bit is then installed from the underside of the rotated head into chuck 154 as previously described. In this orientation, rotation of tool handle 90 about axis 156 loosens a fastener engaged with the bit or socket. Other methods for using tool 10 to loosen a fastener known by those skilled in the art may be used.

In an alternate step not shown, tool 10 grommet tool 104 may be used to dislodge or remove valve assembly grommet 30 from the remaining components of the valve assembly. The tool 104 may also be used to install or seat a grommet or other gasket or component.

The examples of tool 10 provide a highly useful, multi-functional tool that is particularly useful for servicing and installing TPMS valve assemblies. The tool 10 improves and solves existing problems and disadvantages with prior tool kits and systems and provides a faster, more efficient and safer solution for technicians, service garages and end users of the vehicles.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A multi-functional tire pressure monitoring system (TPMS) torque tool for use in servicing TPMS sensors on vehicle wheels, the tool comprising:
   an elongate tool body having a longitudinal axis;
   a torque driver positioned on one end of the tool body having a chuck positioned transverse to a lateral axis;
   a torque sensor connected to the tool body operable to measure a torque force applied by the chuck about the lateral axis to a TPMS sensor fastener;
   an electronic control unit connected to the tool body, the electronic control unit having a memory storage device for storing at least one reference TPMS sensor fastener torque value; and
   a user interface connected to the tool body in electronic communication with the torque sensor and the electronic control unit, the user interface operative to alert a user when the measured TPMS sensor fastener torque value is equal to or exceeds the stored at least one reference TPMS sensor fastener torque value.

2. The tool of claim 1 further comprising:
   a bit holder having an elongate shaft, a first end removably engaged with the chuck and a second end opposite the first end.

3. The tool of claim 2 further comprising:
   a screw driving bit removably engaged with the first end of the bit holder; and
   a socket removably engaged with the second end of the bit holder, the screw driving bit and the socket selectively engagable with a respective TPMS sensor screw and a nut.

4. The tool of claim 3 wherein the bit holder first end defines a multi-faceted elongate bore along the lateral axis, the screw driving bit slidingly received within the elongate bore preventing rotation of the screw driving bit relative to the bit holder about the lateral axis.

5. The tool of claim 3 wherein the socket further comprises a body and a first end and a second end on opposing sides of the body, the first end comprising a TPMS sensor fastener receiving socket of a first size and the second end comprising a TPMS sensor fastener receiving socket of a second size, the second size a different size than the first size, the socket body defining a multi-faceted bore along the lateral axis for sliding engagement with the bit holder shaft preventing rotation of the socket relative to the bit holder about the lateral axis.

6. The tool of claim 1 wherein the at least one reference TPMS sensor fastener torque value comprises a plurality of reference TPMS sensor fastener torque values organized in a database stored in the tool memory storage device.

7. The tool of claim 6 further comprising:
   an information database comprising a plurality of TPMS sensor information stored in the tool memory storage device; and
   an information database comprising a plurality of TPMS sensor brand information stored in the tool memory storage device.

8. The tool of claim 1 wherein the user interface further comprises:
   a visual display;

a graphic user interface positioned on the visual display operable to retrieve the stored at least one reference TPMS sensor fastener torque value; and a keypad to navigate the graphic user interface.

9. The tool of claim 8 wherein the graphic user interface comprises:

a manual mode of operation;

a vehicle make and model year mode of operation;

a TPMS valve mode of operation; and a TPMS sensor brand mode of operation.

10. The tool of claim 1 wherein the electronic control unit further comprises a microprocessor in communication with the memory storage device and the user interface, the microprocessor operable to compare the measured TPMS sensor fastener torque value to the reference TPMS sensor torque value to determine if the alert is needed.

11. The tool of claim 1 wherein the electronic control unit further comprises a signal receiver operative to receive one of a TPMS sensor identification or the reference TPMS sensor fastener torque value from a remote device.

12. The tool of claim 11 wherein the remote device comprises a hand-held TPMS tool.

13. The tool of claim 1 further comprising a TPMS valve grommet removal device.

14. The tool of claim 6 further comprising:

an information database comprising TPMS sensor information for a plurality of TPMS sensors stored in the tool memory storage device.

15. The tool of claim 6 further comprising:

an information database comprising TPMS sensor information for a plurality of one of TPMS brands or TPMS model numbers stored in the tool memory storage device.

16. The tool of claim 8 wherein the graphic user interface comprises:

a manual mode of operation; and one of a vehicle make and model year mode of operation; or a TPMS valve mode of operation; or a TPMS sensor brand mode of operation.

* * * * *